United States Patent [19]

Jones et al.

[11] 4,330,501

[45] May 18, 1982

[54] METHOD AND APPARATUS FOR COOLING FILM BUBBLE OF LOW STRAIN HARDENING POLYMERS

[75] Inventors: David N. Jones, Long Valley; Stuart J. Kurtz, Martinsville, both of N.J.

[73] Assignee: Union Carbide Corporation, Danbury, Conn.

[21] Appl. No.: 164,293

[22] Filed: Jun. 30, 1980

[51] Int. Cl.³ ............................................. B29D 7/22
[52] U.S. Cl. .................................. 264/566; 264/569; 425/72 R; 425/326.1; 425/379 R; 526/124
[58] Field of Search .................. 264/569, 565–566, 264/567; 425/72 R, 326.1, 378 R, 379 R; 526/124

[56] References Cited

U.S. PATENT DOCUMENTS

| | | | |
|---|---|---|---|
| 3,167,814 | 2/1965 | Corbett | 264/569 |
| 3,307,218 | 3/1967 | Reifenhauser | 425/72 R |
| 3,548,042 | 12/1970 | Hinrichs | 264/569 |
| 3,568,252 | 3/1971 | Masuda et al. | 264/569 |
| 3,819,790 | 6/1974 | North et al. | 425/72 R |
| 3,867,083 | 2/1975 | Herrington | 425/326.1 |
| 3,888,609 | 6/1975 | Saint Eve et al. | 425/72 R |
| 3,976,732 | 8/1976 | Herrington | 425/326.1 |
| 4,115,048 | 9/1978 | Alderfer et al. | 425/72 R |
| 4,139,338 | 2/1979 | Cole | 425/72 R |
| 4,145,177 | 3/1979 | Schott, Jr. | 425/72 R |
| 4,243,619 | 1/1981 | Fraser et al. | 264/564 |

FOREIGN PATENT DOCUMENTS

| | | | |
|---|---|---|---|
| 2259732 | 6/1974 | Fed. Rep. of Germany | 264/569 |
| 1120075 | 7/1968 | United Kingdom | 425/326.1 |

Primary Examiner—Jeffery R. Thurlow
Attorney, Agent, or Firm—John A. Shedden

[57] ABSTRACT

A process and apparatus are disclosed for forming blown film of a low strain hardening polymer, such as a low pressure polymerized-low density ethylene copolymer, including an improved film bubble cooling technique which permits high production rates to be achieved with good film bubble stability. The disclosed process comprises cooling a molten film bubble by contacting the outside of the film bubble with separate annular streams of cooling fluid fed through at least two stacked annular cooling rings disposed around the film bubble, wherein all or substantially all of the cooling fluid exits the system through a common plane formed by the last cooling ring.

The disclosed apparatus comprises means for forming a molten film bubble and means for cooling same including at least two separate annular cooling rings disposed around the bubble, each provided with means for feeding an annular cooling fluid stream against the bubble and further including means whereby all or substantially all of said cooling fluid exits the system through a common plane formed by the last cooling ring.

27 Claims, 6 Drawing Figures

U.S. Patent   May 18, 1982   Sheet 1 of 4   4,330,501
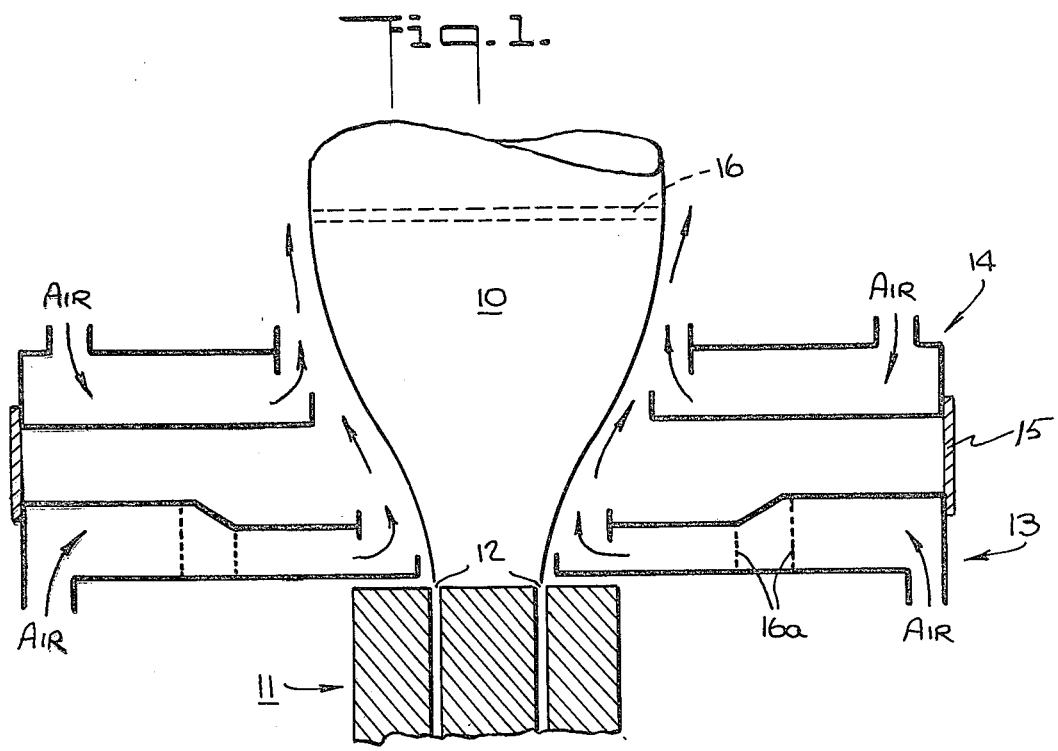
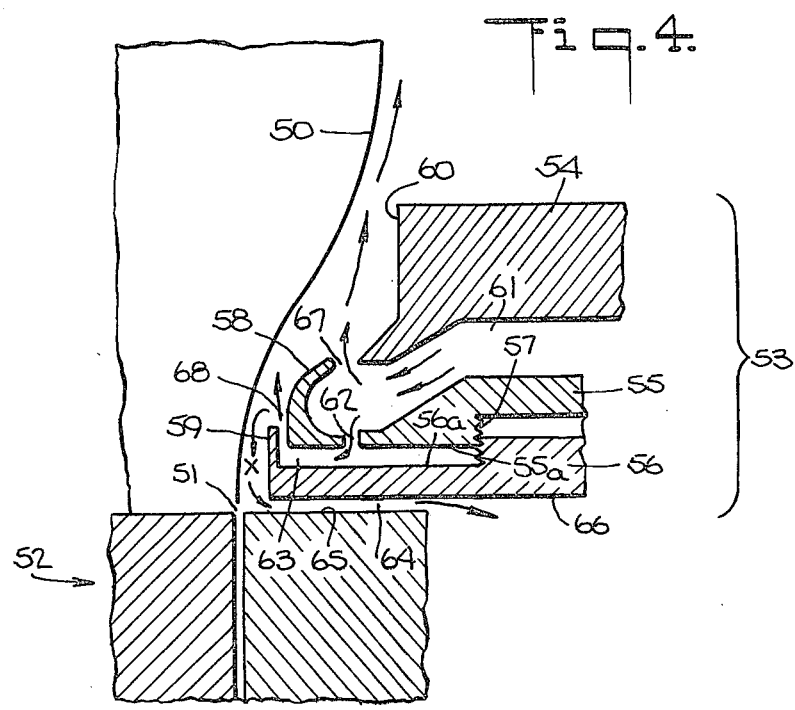

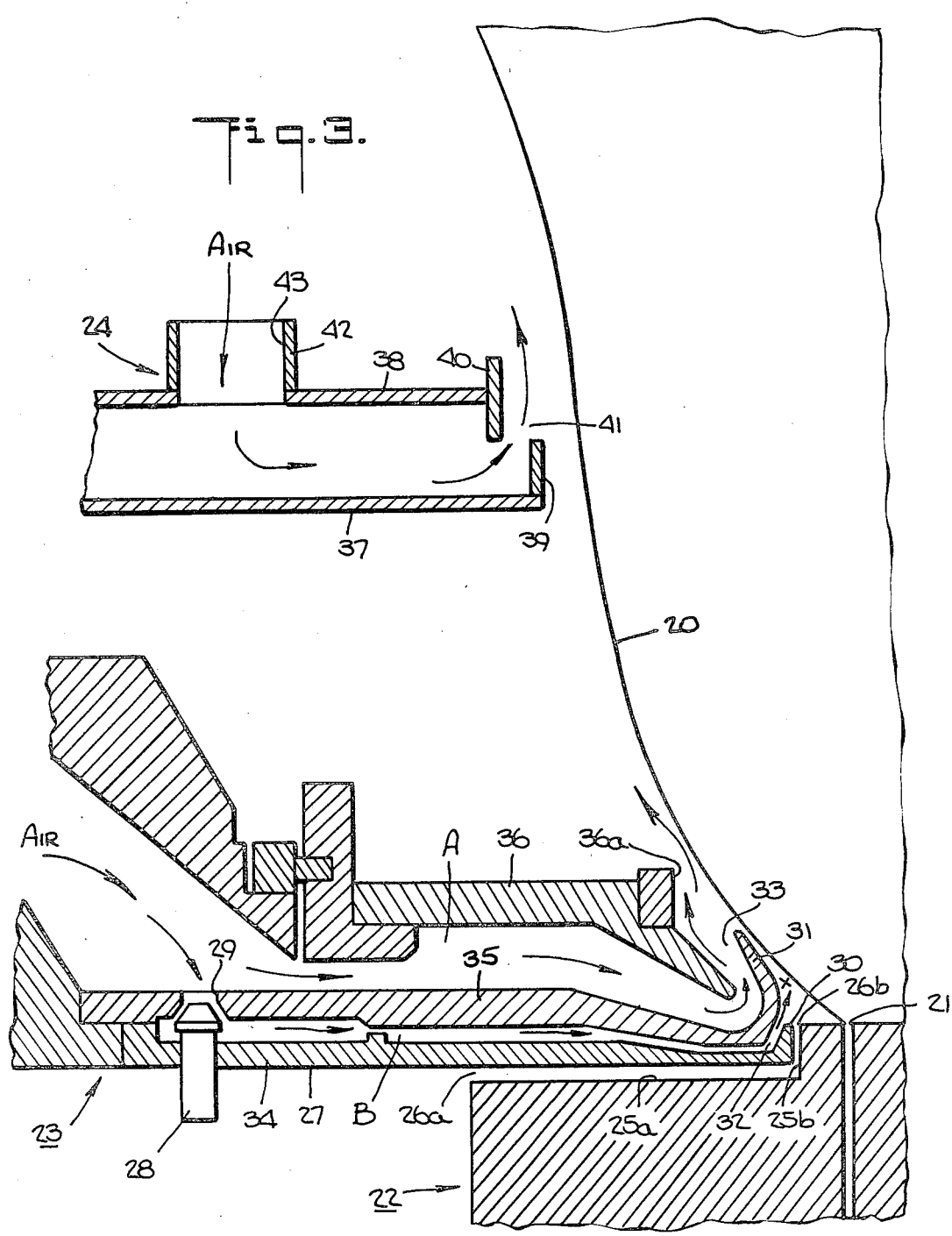

METHOD AND APPARATUS FOR COOLING FILM BUBBLE OF LOW STRAIN HARDENING POLYMERS

BACKGROUND OF THE INVENTION

1. Field of the Invention

The present invention relates to a process and apparatus for the tubular blown film extrusion of a thermoplastic resin and more particularly and in a preferred embodiment, to the tubular blown film extrusion of a low strain hardening polymer, such as a low pressure-low density ethylene copolymer, employing an improved technique for cooling the blown tubular film.

2. Description of the Prior Art

In a conventional technique for forming tubular blown film suitable for the fabrication of bags and the like, a film-forming polymer, such as polyethylene, is extruded through an annular die arranged in an extrusion head so as to form a tube of molten polymer film having a smaller outer diameter than the intended diameter of the eventually-produced film tube. The molten film tube is withdrawn from the extruder and, after cooling to solidify the molten tube, is directed through flattening means such as a collapsing frame and a pair of rollers, which may be driven, and flattens the extruded film tube. Between the point of extrusion and the terminus of the flattening means, the film tube is inflated by means of air or some other gaseous medium to thereby form a film bubble. The bubble is maintained by pressurizing the gas trapped within the expanded film tube between the die and collapsing means. The driven nip rolls may withdraw the molten tubular film away from the annular die at a speed greater than the extrusion speed. This, together with the lateral expansion of the molten film bubble, decreases the film thickness and orients the blown film in both the machine and transverse directions. The degree of lateral expansion and the speed of the driven nip rolls may be controlled to provide the desired film thickness and orientation.

Cooling of the inflated molten tubing has heretofore been achieved by internal or external cooling of the film bubble or both. Regardless of the method of cooling, the point at which the molten film bubble solidifies is referred to in the art as the "frost line."

Internal bubble cooling may be provided by conventional means (see, e.g., U.S. Pat. No. 4,115,048). External cooling of the film bubble may be accomplished by providing one or more annular-shaped air rings around the film bubble. The prior art which teaches the use of air rings to cool a molten thermoplastic film bubble includes, for example, U.S. Pat. Nos. 3,867,083; 3,959,425; 3,976,732; 4,022,558; and 4,118,453; which all disclose the use of multiple, annular-shaped air rings disposed one above the other and around the film bubble. Means are provided both to blow air against the film bubble from each air ring and between adjacent air rings for the blown cooling air to exit from the system.

U.S. Pat. No. 3,548,042 discloses apparatus (and method) for cooling an extruded film bubble, comprising an annular-shaped air ring having an annular insert mounted therein such that cooling air blown into the air ring is divided into three components:

(1) a lowermost component directed perpendicularly against the film bubble just above the die orifice;

(2) an intermediate component which rises helically (clockwise) around and in contact with the film bubble; and (3) an uppermost component which flows in a counter-clockwise direction in contact with the film bubble.

U.S. Pat. No. 3,568,252 discloses an annular device for cooling a film bubble which comprises separate cooling chambers, each provided with slits for blowing cooling air against the film bubble, and an inflating chamber between the slits maintained at a reduced pressure by virtue of the suction created by blowing cooling air from the upper slit. The reduced pressure may be controlled by means of valved air-inlet tubes communicating between the open air and the inflation chamber. Alternatively, separate cooling rings may be provided, each having cooling air slits, the lower cooling ring being provided with an inflation chamber in which a reduced pressure is maintained by virtue of the suction created by the cooling air exiting from the slit in the upper cooling ring. The separate cooling rings are separated by another ring to prevent heat radiation.

Other film bubble external cooling devices are disclosed in, for example, U.S. Pat. Nos. 3,888,609; 4,115,048; and No. Reissue 29,208.

Thermoplastic materials which may be formed into film by the tubular blown film process include polymers of olefins such as ethylene, propylene, and the like. Of these polymers, low density polyethylene (i.e., ethylene polymers having a density of about 0.94 g/cc and lower) constitutes the majority of film formed by the tubular blown film process. Conventionally, low density ethylene polymers have in the past been made commercially by the high pressure (i.e., at pressures of 15,000 psi and higher) homopolymerization of ethylene in stirred and elongated tubular reactors in the absence of solvents using free radical initiators. Recently, low pressure processes for preparing low density ethylene polymers have been developed which have significant advantages as compared to the conventional high pressure process. One such low pressure process is disclosed in commonly-assigned, copending U.S. Applications Ser. No. 892,322, filed Mar. 31, 1978, now abandoned and Ser. No. 12,720, filed Feb. 16, 1979 (a foreign-filed application corresponding thereto has been published as European Patent Publication No. 4647).

The above-identified copending applications disclose a low pressure, gas phase process for producing low density ethylene copolymers having a wide density range of about 0.91 to about 0.94 g/cc and a melt flow ratio of from about 22 to about 36 and which have a relatively low residual catalyst content and a relatively high bulk density. The process comprises copolymerizing ethylene with one or more $C_3$ to $C_8$ alpha-olefin hydrocarbons in the presence of a high activity magnesium-titanium complex catalyst prepared under specific activation conditions with an organo aluminum compound and impregnated in a porous inert carrier material. The copolymers (as applied to these polymers, the term "copolymers" as used herein is also meant to include polymers of ethylene with 2 or more comonomers) thus prepared are copolymers of predominantly (at least about 90 mole percent) ethylene and a minor portion (not more than 10 mole percent) of one or more $C_3$ to $C_8$ alpha-olefin hydrocarbons which should not contain any branching on any of their carbon atoms which is closer than the fourth carbon atom. Examples of such alpha-olefin hydrocarbons are propylene, butene-1, hexene-1, 4-methyl pentene-1 and octene-1.

The catalyst may be prepared by first preparing a precursor composition from a titanium compound (e.g., TiCl4), a magnesium compound (e.g., MgCl2) and an electron donor compound (e.g., tetrahydrofuran) by, for example, dissolving the titanium and magnesium compounds in the electron donor compound and isolating the precursor by crystallization. A porous inert carrier (such as silica) is then impregnated with the precursor such as by dissolving the precursor in the electron donor compound, admixing the support with the dissolved precursor followed by drying to remove the solvent. The resulting impregnated support may be activated by treatment with an activator compound (e.g. triethyl aluminum).

The polymerization process may be conducted by contacting the monomers, in the gas phase, such as in a fluidized bed, with the activated catalyst at a temperature of about 30° to 105° C. and a low pressure of up to about 1000 psi (e.g., from about 150 to 350 psi).

The tubular blown film extrusion process may be employed to form a film from low pressure-low density ethylene copolymers. For example, a process for forming film from one such low pressure-low density ethylene copolymer is disclosed in commonly-assigned, copending U.S. Application Ser. No. 892,324, filed Mar. 31, 1978 now abandoned and U.S. Pat. No. 4,243,619, filed Feb. 16, 1979 (a foreign-filed application corresponding thereto has been published as European Patent Publication No. 6110). However, it has been found that the film production rates obtained in tubular film processes with low pressure-low density ethylene copolymers, utilizing conventional cooling devices and techniques, are low compared to the rates achievable in commercial tubular blown film processes using conventional high pressure-low density polyethylene. Specifically, the properties of low pressure-low density ethylene copolymers are such that commercially desirable high film production rates have not been achieved without film bubble instability. Stated conversely, film bubble instability problems prevent the commercially desirable high film production rates from being obtained in blown film extrusion processes with low pressure-low density ethylene copolymers. The reason for such failures, it is believed, is the extensional behavior of low pressure-low density ethylene copolymers. In comparison to conventional high pressure-low density polyethylene, certain low pressure-low density ethylene copolymers are softer and exhibit less melt strength in extension. As a result, when these low pressure-low density copolymers are extruded from the die in a tubular blown film processes and are externally cooled by blowing air against the resin, the film bubble is unable to resist deformation caused by the increased cooling required by increased throughput rates. In other words, film bubble instability results at higher throughput rates since such rates require more heat transfer in the cooling process which is usually accomplished by increasing the amount and/or velocity of cooling air which in turn deforms the film bubble due to the extensional behavior of low pressure-low density ethylene copolymers.

SUMMARY OF THE INVENTION

The present invention comprises a process and apparatus for forming blown film at high production rates from low strain hardening polymers including an improved technique of cooling a film bubble formed from such polymers. The process of the invention comprises forming a molten film bubble of a low strain hardening polymer and cooling the molten film bubble by contacting the outside of the molten film bubble with separate annular streams of cooling fluid fed through at least two separate stacked annular cooling rings disposed around the film bubble and through which the film bubble advances, wherein all or substantially all of the cooling fluid fed to the cooling rings exits the system through a common plane formed by the last cooling ring through which the film bubble advances. The apparatus of the invention comprises means for forming and advancing a molten film bubble of a low strain hardening polymer and means for cooling said advancing molten film bubble including at least two separate annular cooling rings disposed around said advancing molten film bubble, each of said cooling rings being provided with means for feeding an annular stream of a cooling fluid against the outside of said advancing film bubble, and further including means whereby all or substantially all of said cooling fluid exits the system through a common plane formed by the last cooling ring through which said film bubble advances.

As described more fully hereinbelow, a low strain hardening polymer exhibits an extensional viscosity index of no more than about 4.5, defined as the ratio of polymer extensional viscosity at a total Hencky strain of 2, to its viscosity at a total Hencky strain of 0.2, evaluated at a strain rate of 1.0 second$^{-1}$. This index is a measure of the degree to which the polymer exhibits strain-hardening (i.e., increase of viscosity with increasing strain). For example, conventional high pressure-low density polyethylene exhibits accelerated strain hardening with time upon deformation while certain low pressure-low density ethylene copolymers exhibit little or much less strain hardening. The polymers which exhibit an extensional viscosity index of no more than about 4.5 include, for example, the low pressure-low density ethylene-$C_3$ to $C_8$ alpha-olefin hydrocarbon copolymers described in the aforementioned copending U.S. applications.

BRIEF DESCRIPTION OF THE DRAWINGS

FIG. 1 is a schematic representation of a tubular blown film extrusion process of the invention utilizing two cooling rings.

FIG. 3 illustrates, in greater detail, cooling rings which may be employed in the present invention.

FIG. 4 illustrates another type of cooling ring which may be employed in the present invention.

DESCRIPTION OF THE PREFERRED EMBODIMENTS

Figure 2:
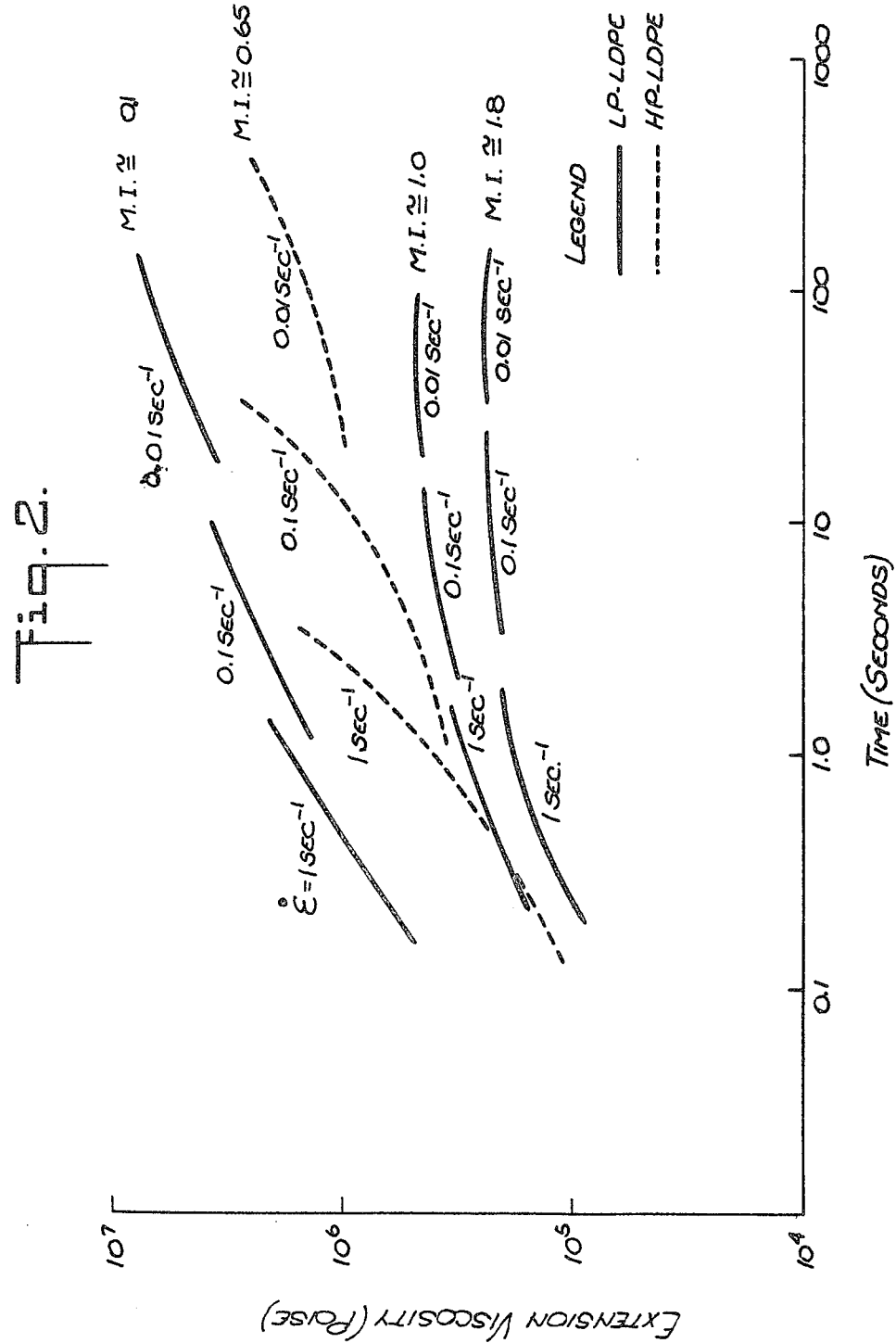
FIG. 2 illustrates the extensional viscosities of conventional high pressure-low density polyethylene and low pressure-low density ethylene copolymers.

For purposes of ease of description only, the present invention will be described herein by reference to low strain hardening polymers comprising low pressure polymerized-low density ethylene copolymers. It is not the intention to thereby limit the invention. As described more fully hereinbelow, the invention is generally applicable to low strain hardening polymers having an extensional viscosity index of no more than about 4.5. Low pressure polymerized-low density ethylene copolymers are one example of such low strain hardening polymers.

In the tubular blown film extrusion process, a molten polymer is extruded through an annular die to form a molten tube which, when inflated with pressurized gas, is referred to in the art as a film bubble. The film bubble is cooled and flattened and then usually wound flat on rolls. Optionally, the film tube may be slit before rolling. Film made by such a process may have a wide range of thicknesses depending upon the particular polymer and end use requirements. In the case of low pressure polymerized-low density ethylene copolymers, film thicknesses within the range of about 0.1 mil to about 20 mils may be formed by tubular blown film extrusion although most film formed of these copolymers will be within the range of about 0.5 mil to about 8 mils, preferably about 0.5 mil to about 2 mils. As in conventional tubular blown film extrusion processes, the film bubble is formed and maintained by inflating and maintaining a positive pressure of gas (e.g., air or nitrogen) inside the tubular film. The gas pressure is controlled to give the desired degree of expansion of the extruded tubular film. The degree of expansion, or so-called blowup ration, as measured by the ratio of the fully expanded tube circumference to the circumference of the die annulus, may be within a range of about 1/1 to about 6/1 and preferably from about 1/1 to about 4/1.

The drawdown characteristics of low pressure-low density ethylene copolymers are excellent. Drawdown, defined as the ratio of the die gap to the product of film gauge and blowup ratio, is kept greater than about 2 to less than about 250 and preferably greater than about 25 to less than about 150. Very thin gauge films can be produced at high drawdown from these copolymers even when the copolymer is highly contaminated with foreign particles and/or gel. Thin gauge films greater than about 0.5 mil can be processed to exhibit ultimate elongations MD greater than about 400% to about 700% and TD greater than about 500% to about 700%. Furthermore, these films are not perceived as "splitty". "Splittiness" is a qualitative term which describes the notched tear response of a film at high deformation rates. It is an end use characteristic of certain types of film and is not well understood from a fundamentals perspective.

As the low pressure-low density ethylene copolymer exits the annular die, the extrudate cools and its temperature falls below its melting point and it solidifies. The optical properties of the extrudate change as crystallization occurs and a frost line is formed. The position of this frost line above the annular die is a measure of the cooling rate of the copolymer film. This cooling rate has a very marked effect on the optical properties of the film produced herein and may be controlled by regulating the velocity and/or temperature of the cooling fluid used to cool the film bubble, as is more fully described in the aforementioned copending Applications Ser. Nos. 892,324, now abandoned and 12,795, now U.S. Pat. No. 4,243,619.

As used herein, the language "low pressure-low density ethylene copolymers" means copolymers of at least about 90 mole percent ethylene with no more than about 10 mole percent of at least one $C_3$ to $C_8$ alpha-olefin hydrocarbon comonomer (e.g., propylene, butene-1, hexene-1, 4-methyl pentene-1 and octene-1) which are copolymerized under low pressure (e.g., 150 to 350 psi). Such copolymers normally have a density no greater than about 0.94 g/cc and typically their density is from about 0.91 to about 0.94 g/cc. In addition, such copolymers generally have a narrow molecular weight distribution range (Mw/Mn) of about 2.7 to 4.5. A specific example of one method for preparing such copolymers is more fully described in the aforementioned copending U.S. applications Ser. Nos. 892,322 abandoned and 12,720, and reference may be made to such applications for a more complete disclosure.

Conventional extrusion apparatus and techniques, applicable to low pressure-low density ethylene copolymers, may be employed in the present invention, e.g., commerically-available extruders, dies, flattening means, nip rolls and windup rolls, etc., may be used. In addition, various conventional additives such as slip agents, antiblocking agents and antioxidants, may be incorporated into the film in accordance with conventional practice.

Additionally, heterogeneous nucleation additives can be added to low pressure-low density copolymers which improve the optical properties of the film formed from these copolymers. Unlike high pressure-low density polyethylene where the optical properties are governed primarily by rheological factors, the optical properties of low pressure-low density ethylene copolymers are controlled by crystallization effects. The heterogeneous nucleation additives provide additional sites to initiate crystallization in these copolymers. An increase in the crystallization and nucleation rate and crystallization temperature and a reduction in spherulite size is achieved. The heterogeneous nucleation additives include high surface area silica, carbon black, phthalocyanine green and phthalocyanine blue pigments. These additives are used in amounts of from about 2.5 ppm to about 2000 ppm.

The process and apparatus of the present invention are generally useful with polymers having low strain hardening, such as certain low pressure-low density ethylene copolymers. The extent to which a polymer exhibits strain hardening may be determined by measuring the extensional viscosity. The extensional viscosity of a polymer can be measured by a number of experimental techniques (see, for example, J. L. White, Report No. 104 of the Polymer Science and Engineering Department, University of Tennessee, Knoxville). As used herein, the terminology "extensional viscosity" indicates an extensional viscosity determined by a constant strain rate method; for example, utilizing the technique and apparatus described in M. T. Shaw, "Extensional Viscosity of Melts Using a Programmable Tensile Testing Machine", Proceedings, VIIth International Congress on Rheology, 1976. As described in the cited Shaw reference, the method uses a servo-controlled Instron tensile testing machine. The ends of a molten ring of polymer, immersed in a silicone oil bath, are separated at an accelerating rate according to the following relationship:

$$L(t) = L_0 \exp(\epsilon t)$$

where
$L(t)$ = jaw separation at time t (inches)
$L_0$ = initial jaw separation (inches)
$\epsilon$ = strain rate ($\sec^{-1}$), a constant
$t$ = time (seconds)

A force transducer measures load during the deformation and the extensional viscosity is calculated by dividing stress by the strain rate and is determined as a function of strain or time during the deformation at a temperature of about 150° C.

Using this technique, when conventional high pressure-low density polyethylene melts are deformed according to the above equation, extensional viscosity is observed to increase at an accelerating rate with log time. This behavior is shown in FIG. 2 of the drawings for a high pressure polymerized-low density polyethylene having a melt index of 0.65 and a density of 0.92 g/cc. FIG. 2 illustrates the extensional viscosity of this material at 3 different strain rates (as represented by the three dotted line curves in FIG. 2). The strain hardening of such a conventional high pressure-low density polyethylene intensifies as the strain rate is increased.

Certain low pressure-low density ethylene copolymers exhibit little strain hardening when strain rates are low. FIG. 2 (see the solid-line curves) shows that strain hardening intensifies at higher strain rates, and more so for the lower melt index resins, but not to the degree observed in the conventional high pressure-low density polyethylenes. In addition, narrow molecular weight distribution low pressure-low density ethylene copolymers exhibit less strain hardening tendencies than similar ethylene copolymers having a broader molecular weight distribution.

Low strain hardening polymers may be defined as polymers having an extensional viscosity index of no more than about 4.5. This index is the ratio of the extensional viscosity of the polymer determined at a total Hencky strain of 2 to its extensional viscosity determined at a total Hencky strain of 0.2, both being determined at a strain rate of 1.0 second$^1$. These viscosity values may be directly measured or may be obtained from an appropriate viscosity curve, as in FIG. 2 of the drawings. As shown in FIG. 2, the total strain may be obtained by multiplying the indicated strain rate and the corresponding time since a constant strain rate is employed in the test. A definition of Hencky strain may be found in J. M. Dealy, "Extensional Rheometers for Molten Polymers; A Review", Journal of NonNewtonian Fluid Mechanics, 4(1978) 9-21. Generally speaking, although such low strain hardening polymers include those having an extensional viscosity index as defined above of no more than about 4.5, it is preferred that such polymers have an extensional viscosity index of no more than about 3.5.

Low pressure-low density ethylene—$C_3$ to $C_8$ alpha-olefin hydrocarbon copolymers generally exhibit an extensional viscosity index of no more than about 4.5. For example, a 2.0 melt index low pressure polymerized copolymer of ethylene and butene-1, having a density of 0.918 g/cc, has an extensional viscosity index of 2.3. Similarly, a 1.0 melt index low pressure polymerized copolymer of ethylene and butene-1, having a density of 0.918 g/cc, has an extensional viscosity index of 2.6. In comparison, a 2.0 melt index conventional high pressure polymerized-low density polyethylene (density of about 0.918; available from Union Carbide Corporation under the tradename DYNH-9) has an extensional viscosity index of 7.7.

Referring now to the drawings, FIG. 1 schematically illustrates a portion of a tubular blown film extrusion process employing the techniques of the present invention to cool the molten film bubble. Specifically, a molten film bubble 10 is shown being extruded through lips 12 of an annular die 11 in a vertically upward direction as shown, although it may also be extruded downward or even sideways. The upstream apparatus (e.g., an extruder, etc.) is not shown although conventional process and apparatus may be employed to melt and advance the polymer material to the annular die 11. Similarly, although no downstream apparatus (e.g., collapsing and flattening means, windup rolls, etc.) is shown, conventional apparatus and processes may be used to treat and handle the film. The molten film bubble 10 is cooled with air or other fluid blown against the outside perimeter of the film bubble through two coolings rings 13 and 14. As a result of the air cooling, a frost line 16 is formed. The height of the frost line above the die primarily depends upon the rate at which the film bubble is cooled and may be adjusted by controlling this cooling rate. The lower cooling ring 13 may be provided with air baffles 16a to regulate and distribute the flow of air therethrough. Both cooling rings 13 and 14 are annular in shape and each provides an annular-shaped stream of air surrounding and cooling the advancing film bubble 10, as shown by the airflow arrows in FIG. 1.

The lower cooling ring 13 is also referred to as the primary cooling ring since it cools the film bubble quickly to a point where the bubble can withstand the cooling air from the upper or secondary cooling ring 14 without becoming unstable; i.e., the extensional viscosity of the film bubble (cooled by the blown air from the primary cooling ring) is increased sufficiently to resist even higher blown air velocities from the secondary cooling rings without deforming. The upper or secondary cooling ring 14 provides an additional annular-shaped stream of cooling air against the advancing film bubble 10 at a point below the frost line 16. As shown, means such as plate 15 are provided to seal the space between the upper and lower cooling rings 13 and 14 such that all or substantially all of the cooling air fed to both cooling rings exits from the system through a common plane at the uppermost portion of the upper cooling ring 14. Any suitable means for sealing the space between the cooling rings may be employed in the practice of the present invention. In addition, should more than two cooling rings be utilized, the space between each adjacent set of cooling rings should be sealed in an appropriate manner to assure that all or substantially all of the cooling air exits through the common plane at the uppermost portion of the last cooling ring.

FIG. 3 of the drawings illustrates in greater detail the process and apparatus of the present invention, employing two separate cooling rings to cool an advancing film bubble in a tubular blown film extrusion process. Referring to FIG. 3, a molten film bubble 20 is extruded from die lip 21 of die 22 in a vertically upward direction. Cooling rings indicated generally at 23 and 24 are provided to cool the advancing film bubble. The lower or primary cooling ring 23 generally comprises upper piece 36, middle piece 35 and lower piece 34 defining cooling fluid channels A and B. A valve 28 may be provided to close off orifice 29 preventing the cooling fluid such as air from entering cooling channel B. As shown in FIG. 3, valve 28 is in an open position enabling the cooling fluid to flow through the lower cooling channel B, through lower orifice 32 and over lower lip 30 into contact with the advancing film bubble 20. The cooling air also flows through upper cooling channel A, is deflected by curved piece 31, proceeds through upper orifice 33, is deflected by upper lip 36a and contacts the advancing film bubble 20.

The upper cooling ring, generally indicated 24, comprises upper plate 38 and lower plate 37, each respectively supporting upper lip 40 and lower lip 13 which together define an orifice 41 through which cooling fluid flows into contact with the advancing film bubble 20. As shown, the cooling fluid such as air is fed into cooling ring 24 through an aperture 43 of channel 42.

The cooling ring 23 in FIG. 3 is adjustable in several respects. As noted above, valve 28 may be used to partially or completely close cooling channel B. In addition, upper piece 36 may be vertically moved to adjust the height of upper lip 36a and the gap of cooling channel A. Finally, means (not shown) may be provided to vertically adjust the entire cooling ring 23 toward or away from face 25a formed by a recess in the face of die 22, to thereby open or close vent space 26a. If space 26a is open, part of the air exiting from lower orifice 32 may be vented by flowing through space 26b defined by lower lip 30 and face 25b in the die recess and then through space 26a. Factors such as the shape and size of the cooling rings employed, their respective lip configurations and the distance between cooling rings may be selected and controlled as discussed below to control the cooling rate and stability of the advancing film bubble. It is preferred that lip configurations be employed which avoid flow of cooling fluid directly perpendicular to the advancing film bubble.

The air supply to the cooling rings may be from a common source or from separate sources, as desired. Generally, when two cooling rings are used such as schematically represented in FIG. 1, the lower cooling ring will provide most of the total air blown against the molten film bubble. More specifically, the amount of air fed through the secondary cooling ring may be varied within the range of 25 to 75% of the total cooling air, depending upon the temperature of the film bubble, the temperature and velocity of the cooling air, etc. Generally, film bubbles of low strain hardening polymers at lower temperatures can tolerate higher air velocities without becoming unstable. Therefore, the relative amounts and velocities of cooling air fed to the lower and upper cooling rings in the invention may be adjusted accordingly to obtain a stable film bubble. Temperature measurements indicate that the primary cooling ring cools a film bubble of a low pressure-low density ethylene copolymer by about 75°–100° F. from the melt temperature which will produce increases in extensional viscosity and stiffness of roughly 80–100%. These data tend to support the concept of multi-stage cooling in which the molten film bubble is subjected, by the primary cooling ring, to a relatively low velocity, low turbulence air stream that provides incremental cooling sufficient to increase the melt strength characteristics of the film bubble to a level capable, without instability problems, of withstanding the deformation of high velocity, highly turbulent cooling from the secondary cooling ring. This combination of air flows was also found to create a slight vacuum (on the order of 0.09 inch of water below atmospheric) in the sealed chamber between the cooling rings. The resulting pressure forces tend to push the film bubble outwardly in this chamber which reduces film flapping thereby producing a stabilizing effect. In addition, the film bubble is reduced in diameter inwardly while passing through the secondary cooling ring where a second venturi region occurs. This is followed by typical expansion above the secondary air ring and further cooling.

The cooling air is preferably refrigerated as is conventional; for example, when processing low pressure-low density ethylene copolymers, the cooling air is preferably refrigerated to a temperature of about 40° to 60° F. Employing such refrigerated air enables the film bubble to be cooled more rapidly, permitting higher production rates and is therefore preferred. Generally, in the case of using only two cooling rings as schematically illustrated in FIG. 1, refrigerated cooling air may be fed to the bottom ring at a rate of about 30 to 60 SCFM per inch of die diameter, and to the top air ring at a rate of about 20 to 50 SCFM per inch of die diameter.

For low pressure-low density ethylene copolymers, the molten film bubble generally exits the die at a temperature between about 380° and 480° F., preferably between about 380° and 450° F. Where the temperature is too low, the risk of the resin film splitting increases and with temperatures above about 480° F., the likelihood of degradation of the polymer is increased. The minimum temperature of the resin is a function of its melt index with lower melt index resins requiring higher processing temperatures.

As disclosed in the aforementioned copending application, Ser. No. 892,324 abandoned and U.S. Pat. No. 4,243,619, low pressure-low density ethylene copolymers may be formed into film without melt fracture by the tubular blown film extrusion process using a die gap of greater than about 50 mils. For the process of the present invention, the die gap may be on the order of from about 50 to about 150 mils. However, low pressure-low density ethylene copolymers may also be processed into film by the tubular blown film extrusion process using die gaps smaller than 50 mils. The presently preferred die lip configurations are those disclosed in commonly-assigned, copending U.S. Application Ser. No. 99,061, filed Dec. 12, 1979 now U.S. Pat. No. 4,282,177. Generally, as disclosed therein, the die lip and/or die land in contact with the molten polymer is at an angle of divergence or convergence relative to the axis of flow of molten polymer through the die. Such configurations reduce melt fracture in the film product.

The techniques of the present invention may be used to maintain normal bubble shape for the extruded film bubble, i.e., maintain a smooth profile with the fewest number of bulges and contractions. Depending upon the particular resin being processed, the size of the die and die gap, and the production rate, it may be necessary to conduct some amount of trial and error operations to select the optimum configuration of cooling rings to obtain an optimum film bubble shape. Based upon the following considerations, one of ordinary skill in the art should be able to obtain the desired bubble shape.

Generally, a conventional commercially-available air ring can be employed as the primary or lower cooling ring of the present invention. Similarly, conventional air rings may be employed as the upper or secondary cooling ring of the invention. In addition, it has been found that the secondary cooling ring of the invention may comprise a relatively simple structure on the order of cooling ring 24 shown in FIG. 3, discussed in more detail below. These simple structures may also be used as the primary or lower cooling ring in the present invention. Further, more than two cooling rings may be utilized.

Commercially-available air rings which may be utilized as the primary cooling ring in the present invention include, for example, those available from Gloucester Engineering Co, Inc. (e.g., series 700 models) and those available from Filmaster. Such air rings can be either single orifice-type or so-called dual lip models. The size of the orifice or gaps may be fixed or may be adjustable depending upon the particular model air ring employed. The dual lip air rings are preferred over the single orifice types. FIG. 3 illustrates a preferred adjustable-gap dual lip air ring commercially-available from Gloucester (i.e., as Gloucester Model 708 with dual lip inserts). The valve 28 in FIG. 3 can be adjusted to regulate the flow of cooling air through lower channel B and orifice 32. Similarly, upper piece 36 can be raised or lowered vertically to adjust the size of upper orifice or gap 33. This, of course, has the simultaneous effect of extending or shortening the height of the upper lip 36a.

Another type of dual lip adjustable-gap air ring which may be employed as the primary cooling ring in the present invention is illustrated in FIG. 4. This type of air ring is commercially available from Filmaster. As shown in FIG. 4, a film bubble 50 is extruded from die lip 51 of die 52 in a vertically upward direction as shown in the figure. An air ring, generally indicated at 53 is employed to blow cooling air against the outside periphery of the extruded film bubble. The direction of air flow is shown in FIG. 4 by the arrows. The air ring 53 comprises an upper piece 54 having an upper lip 60, a vertically-adjustable center piece 55 terminating in a curved piece 58, and a bottom piece 56 including a lower lip 59. A cooling fluid such as air is directed through cooling channel 61 by suitable blowing means (not shown). Part of the air flow is diverted upwardly by curved piece 58 through opening 67 into contact with the film bubble 50. This air is channeled into contact with the film bubble 50 by means of upper lip 60. The remaining portion of the cooling air from channel 61 is diverted through opening 62 in center piece 55 into channel 63 from which it is diverted upwardly by lower lip 59 through opening 68 into contact with the film bubble 50. Center piece 55 may be adjusted in a vertical direction such as by means of threads 57 which connect center piece 55 and bottom piece 56. The gap formed between lower face 55a of center piece 55 and upper face 56a of bottom piece 56 may be adjusted accordingly. Air ring 53 in FIG. 4 is shown as being supported (by means not shown) above the top surface 65 of the die 52, defining a channel 64 between the upper die face 65 and the lower face 66 of air ring 53. This has the effect of siphoning off some of the air flowing through opening 68, downwardly between film bubble 50 and lower lip 59, and then through space 64 for venting outwardly from the cooling system as shown by the arrows in FIG. 4. It is not necessary that the primary cooling ring be separated from the upper die face. Depending on the lip configuration of the primary air ring, it may be disposed directly on or recessed in the upper die face, as discussed below.

Other commercially-available air rings, or a cooling ring of the type shown by cooling ring 24 in FIG. 3, can be employed as the primary cooling ring of the invention, including those with only a single orifice for the cooling air. Similarly, other adjustable-gap, dual lip air rings may be employed for this purpose as well. As the secondary or upper cooling ring of the invention, a commercially available single orifice air ring may be employed, such as those commercially available from Sterling Extruder or Victor Engineering. Normally, a single orifice air ring is employed as the upper or secondary cooling ring of the present invention. Such air rings normally have vertically-adjustable upper lips for adjusting the vertical gap between the bottom of the upper lip and the bottom surface of the air channel. In this manner, the velocity and amount of air which may be fed through such an air ring may be controlled.

Figure 5:
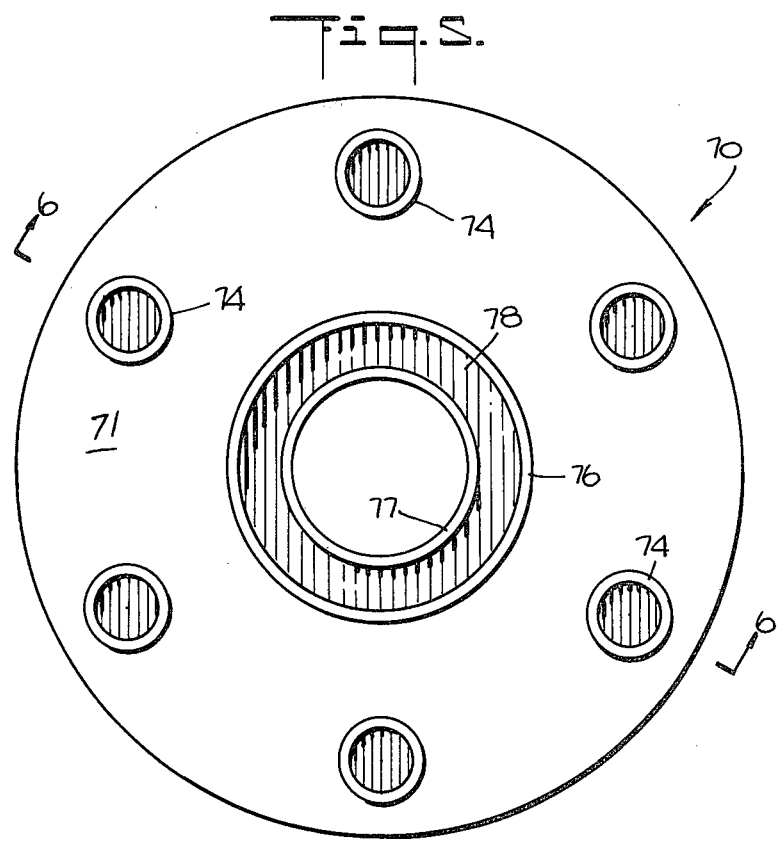
FIG. 5 is a plan view of a cooling ring which may be employed as a secondary cooling ring in the present invention.
Figure 6:
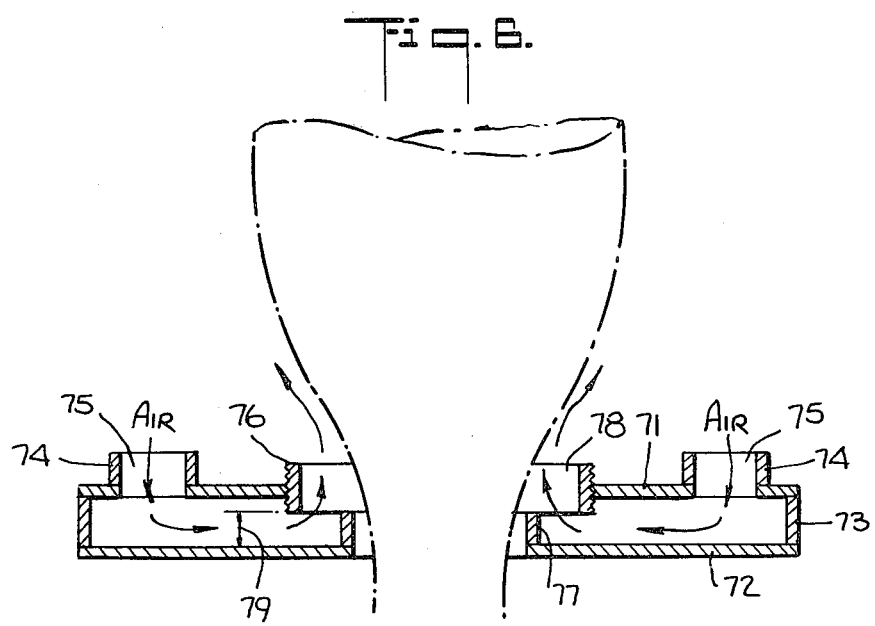
FIG. 6 is a cross-sectional view, taken along the line 6—6 of FIG. 5, of the cooling ring of FIG. 5.

Instead of employing a commercially-available air ring in the present invention, a more simpler and less expensive type of device of the type shown in FIGS. 5 and 6 may be employed. Referring to FIGS. 5 and 6, cooling ring 70 comprises an upper annular plate 71 and a lower annular plate 72, surrounded by and connected by a circular collar 73. Affixed to the annular opening of top plate 71 is an upper lip 76 which may be made vertically adjustable such as by suitable threading arrangements. Similarly, a lower lip 77 is affixed to bottom plate 72 as shown, which, together with upper lip 76 defines an annular opening or horizontal gap 78. If upper lip 76 is vertically adjustable, vertical gap 79 may also be adjusted depending upon the dimensions desired. A plurality of upstanding channels 74 are provided, which have openings 75 communicating with the interior of cooling ring 70. These may be connected to a source of cooling air which, when blown through openings 75, flows into the interior of cooling ring 70 and out of opening 78 thereby forming an annular upwardly directed air stream, as shown by the arrows in FIG. 6, into contact with the film bubble (shown by the dotted lines in FIG. 6). As shown in FIGS. 5 and 6, the construction of cooling ring 70 is relatively simple. It may be constructed, for example, of any suitable material such as welded sheets of aluminum, steel, etc. No special design considerations other than preferred geometries (as discussed below) are required. It will be appreciated by those skilled in the art that the cooling ring represented by FIGS. 5 and 6 is much less complicated then commercially-available air rings.

Although FIGS. 5 and 6 indicate that the source of cooling air to the cooling ring 70 is from the top through openings 75, which is the preferred arrangement, it is also possible to feed cooling air to such a cooling ring from the side or even from the bottom.

Depending upon the configuration of the lips of the cooling rings used in the present invention, a venturi action may be caused due to a narrowing of the space between the cooling ring and the film bubble as a result of which the velocity of the cooling fluid increases. Such a venturi action has a vacuum effect which draws the film bubble toward the cooling ring. Generally, the lip configurations which favor the formation of a venturi action are those which both direct the cooling fluid against the film bubble in a direction as parallel to the film bubble as possible and maintain a restricted cross-sectional space between the cooling ring and film bubble through which the cooling fluid flows. Specifically, higher lower lip heights favor parallel flow and improved bubble stability. In some instances the venturi action may tend to cause the film bubble to be deflected toward or contact the lower lip of the air ring unless the machine direction strength of the film bubble is high, or the height of the lower lip is decreased, or the lower lip is recessed into the face of the die (as shown in FIG. 3) or unless the vacuum generated by the air flow is broken by venting air between the air ring and the die face as shown in FIG. 4. It has also been found that the stability of a film bubble may be improved and the film production rate increased by (in the case of a single orifice air ring used as the primary cooling ring) a combination of recessing the air ring into the die face, using a larger air ring gap (i.e., the size of the orifice(s) of an air ring) and venting air between the bottom of the air ring and the face of the die as shown in FIG. 4. It is therefore preferred to provide a space between the lower or primary cooling ring and the die. In some instances and depending on the lip configuration instead of air being vented outwardly through such space, it may be drawn into the system through such space. In any event, even if air is vented outwardly through this space, it is only a small amount (e.g., about 1%) of the total air used to cool the film bubble.

Alternatively, instead of utilizing a single orifice air ring as the primary cooling ring, a dual lip air ring may be employed as the primary cooling ring. It has been found that with dual lip air rings, a sufficient amount of cooling air is forced into the region labeled X in FIGS. 3 and 4 to maintain a positive pressure in such region and prevent the film bubble from contacting the lower lip of the air ring. Through trial and error, it may be possible to adjust the air flow from the lower orifice of a dual lip air ring to thereby adjust the pressure in region X to obtain the straightest possible film bubble in that region.

The height of the upper lip of the primary cooling ring (which, in the case of single orifice air rings, is used to adjust air ring gap thus partially defining air volume and air velocity) assists in maintaining the so-called venturi action by preventing the upflowing cooling air from being diverted away from the film bubble. The loss of the venturi action in this region would reduce the stability of the film bubble. Therefore, the upper lip height of the air ring used as a primary cooling ring in the present invention should be adjusted to obtain the desired film bubble shape and stability.

The function of the secondary or upper cooling rings in the invention is to further stabilize the film bubble and provide additional cooling air after the film bubble has been partially cooled and stiffened such that it can withstand higher cooling air velocities. The diameter of the central opening of the secondary cooling ring employed in the invention depends to an extent upon the desired blowup ratio. Generally, with a low blowup ratio, a relatively larger diameter cooling ring might produce a somewhat slack film bubble since the film bubble will be drawn out toward the cooling ring central opening diameter which might approach or even be larger than the ultimate film bubble diameter. Hence, with small diameter secondary cooling rings and/or low blowup ratios, the film bubble may have a tendency to produce "waists" above the secondary cooling ring (i.e., the film bubble will bulge at or near the cooling ring and narrow downstream of the cooling ring). This result will occur more often when both primary and secondary cooling rings are operating in the so-called venturi mode (i.e., when the cooling air is accelerated past the upper lip of the respective cooling rings).

The height of the lower lip of the secondary cooling rings is not critical. In fact, larger air volumes are possible with greater lower lip heights since this arrangement allows a larger lip gap while still directing the cooling air almost completely vertical. However, this might have the effect of cutting into the film bubble above the secondary cooling ring, and hence the height of the lower lip and the air velocity should be balanced to avoid occurrence of this cutting phenomenon.

The preferred maximum height of the upper lip of the secondary cooling ring is about 4 inches, although its height is preferably between about 2 and about 4 inches. It should also preferably extend at least 1 inch higher than the height of the lower lip. If the upper lip is extended too far beyond the height of the secondary cooling ring, the film bubble has a tendency to flutter or violently move back and forth in a horizontal direction.

Another dimension which affects the stability of the film bubble and the film bubble shape is the distance between the primary and secondary cooling rings. This distance is generally between about 4 and about 15 inches, preferably between about 6 and about 12 inches.

When processing low pressure-low density ethylene copolymers, a small amount, up to about 10 weight percent, based on the total weight of polymer being processed, of a conventional high pressure-low density polyethylene may be added.

Those skilled in the art may, based upon the foregoing considerations, select appropriate commercially-available apparatus and select appropriate lip configurations and geometries to achieve a stable film bubble having the desired normal film bubble shape. The examples which follow further illustrate the adjustments that can be made to achieve the desired results.

As used herein, the term "melt index" means the melt index determined as specified in ASTM D-1238, Condition E, measured at 190° C., reported as grams per 10 minutes.

EXAMPLES 1-7

Blown film was prepared from GRSN-7040 (i.e., a 2.0 melt index, 0.920 g/cc density, low pressure polymerized ethylene copolymer of ethylene and butene-1 commercially available from Union Carbide Corp.) using the following apparatus:

Extruder: 3½ inch diameter Egan
Screw:
    L/D=24/1
    maximum speed=104 rpm
    type=low-shear mixing screw designed for 0.2 melt index high density polyethylene
Die:
    type=6 inch (diameter) annular spiral mandrel type
    die gap=100 mils at exit tapering (over 7/16 inch) to 50 mils The primary cooling ring was a Gloucester Engineering Model 708 single orifice air ring having 4 tangential air inlets supplied by a 5 HP variable speed blower rated at 1790 CFM at 11.5 inches of water, and having an adjustable lip height. The secondary cooling ring, was a Sterling 15 inch air ring with inserts for 8 inch or 12 inch dies, having 4 tangential air inlets supplied by a 10 HP variable speed blower rated at 1970 CFM at 12 inches of water, and having an adjustable lip height. A sheet metal shield and a plastic film diaphragm was used to maintain a seal between the two air rings.

The conditions under which maximum film production rates were obtained are shown in Table I below (the primary cooling ring was recessed into the die face with no vent space between the bottom of the air ring and the die recess).

TABLE I

|  | Example No. |  |  |  |  |  |  |
| --- | --- | --- | --- | --- | --- | --- | --- |
|  | 1 | 2 | 3 | 4 | 5 | 6 | 7 |
|  | Single Air Ring | | Stacked Air Rings | | | | |
| Max. Rate, Lbs/hr/inch[b] | 6.8 | 7.7 | 10.9 | 11.0 | 10.9 | 11.9 | 13.6 |
| Flat Width, inches | 18 | 18 | 20 | 18 | 31 | 31 | 31.5 |
| Primary Lip Gap, inches | 0.30 | 0.50 | 0.15 | 0.30 | 0.15 | 0.30 | 0.30 |
| Primary Upper Lip height, inches | $2\frac{1}{4}$ | $2\frac{1}{2}$ | $2\frac{1}{4}$ | $1\frac{3}{4}$ | $2\frac{1}{4}$ | $1\frac{3}{4}$ | $1\frac{3}{4}$ |
| Primary Air Supply Pressure, inches H$_2$O | 9 | 11.0 | 9.6 | 7.5 | 9.6 | 6.2 | 6.8 |
| Primary Air Temperature after Blower, °F. | 78 | 38 | 78 | 86 | 77 | 80 | 31 |
| Spacing between Air Rings, inches | — | — | 11 | 5.9 | 11 | 8.4 | 8.4 |
| Secondary Air Ring, Insert size, inches | — | — | 8 | 12 | 8 | 12 | 12 |
| Secondary Lip Gap, inches | — | — | 0.25 | 0.25 | 0.25 | 0.25 | 0.25 |
| Secondary Upper Lip Height, inches | — | — | 4 | 3 | $7\frac{1}{4}$[a] | 4 | 4 |
| Secondary Air Supply Pressure, inches H$_2$O | — | — | 11.5 | 7.8 | 10.8 | 11.6 | 12.8 |
| Secondary Air temperature after Blower, °F. | — | — | 78 | 86 | 77 | 80 | 31 |
| Frost Line, inches above Die | 30 | 28 | 45 | 37 | 32 | 32 | 32 |
| Melt Temperature, °F. | 390 | 402 | 416 | 411 | 416 | 419 | 422 |
| Melt Pressure, psi | 7450 | 9750 | 8650 | 8600 | 8650 | 8750 | 9000 |

NOTES TO TABLE I
[a] Five staggered rings simulating collars.
[b] Rate, lbs/hr/inch = lbs of polymer film/hour/inch of die circumference.

Examples 1 and 2 are presented merely for comparision purposes. Since only a single air ring was used in these examples, they are not within the scope of the present invention.

EXAMPLES 8-11

Blown film from GRSN-7040 was made using the following apparatus:
Extruders:
  2½ inch NRM
  53 millimeter ZDSK twin screw
NRM Screw:
  L/D = 16/1
  maximum speed = 120 rpm
  type = double flighted mixing screw
Die:
  type = 6 inch Egan (diee gap = 120 mils)
Primary Cooling rings:
  (1) Egan single orifice
  (2) Dual lip Filmaster
Secondary Cooling ring:
  Sterling 8 inch die lips, single lip design
The space between the primary and secondary cooling rings was sealed as in Examples 1-7. The extruders were connected in parallel to the die.

The conditions under which maximum (1.5 mil thick, 18 inches lay flat width) film production rates were obtained are shown in Table II below:

TABLE II

|  | Example No. | | | |
| --- | --- | --- | --- | --- |
|  | 8 | 9 | 10 | 11 |
|  | Single Air Ring | | Stacked Air Rings | |
| Maximum Rate, lbs/hr/inch | 7.5 | 8.6 | 11.0 | 12.3 |
| Primary Air Ring, Type | Egan | Filmaster | Egan | Filmaster |
| Upper Lip Height, inches | 1.5 | 1.4 | 1.5 | 1.4 |
| Supply Pressure, inches H$_2$O | 4.0 | 4.0 | 5.8[a] | 5.8[a] |
| Air Temperature before Blower, °F. | 50 | 50 | 50 | 50 |
| Spacing between Air Rings, inches | — | — | 6 | 6 |
| Secondary Air Ring | | | | |
| Upper Lip Height | — | — | 2 | 2 |
| Supply Pressure, inches H$_2$O | — | — | 5.8[a] | 5.8[a] |
| Air Temperature, °F. | — | — | 50 | 50 |
| Frost Line, inches above Die | 43 | 53 | 56 | 52 |
| Melt Temperature, °F. | 419 | 424 | 421 | 440 |
| Melt Pressure, psi | <3000 | <3000 <3000 | <3000 |  |
| Die Gap, mils | 100 | 100 | 120 | 120 |

[a] Maximum available.

Examples 8 and 9 are included for comparison purposes only since both are outside the scope of the present invention since only a single cooling ring was used.

EXAMPLES 12–21

The resin, procedure and equipment used in Examples 1–7 were employed to produce 1.5 mil thick film at various blowup ratios and layflat widths. The maximum film production rates obtainable are shown in Table III below together with other pertinent conditions of operation:

TABLE III

|  | Example No. | | | | | | | | | |
| --- | --- | --- | --- | --- | --- | --- | --- | --- | --- | --- |
|  | 12 | 13 | 14 | 15 | 16 | 17 | 18 | 19 | 20 | 21 |
| Secondary Cooling Ring Insert size, inches | (a) | 8 | 8 | 8 | 8 | 12 | 12 | 12 | 12 | 12 |
| Flat Width, inches | 18 | 12 | 18 | 20 | 30 | 18 | 21 | 28 | 31 | 31.5 |
| BUR (D:d) (b) | 1.9 | 1.3 | 1.9 | 2.1 | 3.2 | 1.9 | 2.2 | 3.0 | 3.3 | 3.3 |
| Secondary Air Temperature, °F. | 38 | 80 | 80 | 80 | 80 | 80 | 80 | 80 | 80 | 31 |
| Rate, lbs/hr/inch | 7.7 | 8.8 | 9.6 | 10.9 | 10.5 | 11.0 | 11.1 | 10.6 | 11.9 | 13.6 |
| Bubble Pressure, inches $H_2O$ | 0.15 | 0.055 | 0.06 | 0.085 | 0.065 | 0.045 | 0.04 | 0.048 | 0.040 | 0.045 |

(a) No secondary cooling ring
(b) BUR = blowup ratio D = maximum tube diameter, inches d = die diameter, inches Example 12 is included only for purposes of comparison. As the data indicate, use of a 12 inch diameter secondary cooling ring permitted slightly higher production rates at high blowup ratios. The 12 inch cooling ring however was not satisfactory below 1.9 BUR. In addition, although not shown in Table III, the lowest blowup ratios with each size secondary cooling ring produced a somewhat slack bubble since the bubble was drawn out to a larger diameter in the secondary cooling ring than the final bubble diameter and the film contained wrinkles.

EXAMPLES 22–25

The resin, procedures and equipment of Examples 1–7 was employed to produce 1.5 mil thick, 18 inch layflat width film. The Gloucester air ring used as the primary cooling ring was equipped with a 1⅛ inch high×7 inch ID lower lip, recessed ⅞ inch into the die face; and a 2.5 inch high×8 inch ID upper lip. The Sterling air ring used as the secondary cooling ring was equipped with a 1¼ inch high×9½ inch ID lower lip; and a 3 inch high×10½ inch ID upper lip. Room temperature air was used as cooling air in all runs. The results and pertinent conditions are shown in Table IV below:

TABLE IV

|  | Example No. | | | |
| --- | --- | --- | --- | --- |
|  | 22 | 23 | 24 | 25 |
|  | No Stack | Stacked Configuration | | |
| Primary Cooling Ring Maximum Settings | | | | |
| Lip Gap, inches | 0.3 to 0.5 | 0.10 | 0.15 | 0.30 |
| Air Supply Pressure, inches $H_2O$ | 9 | 11.4 | 9.6 | 4.5 |
| Secondary Cooling Ring | None | | | |
| Lip Gap, inches | None | 0.25 | 0.25 | 0.25 |
| Air Supply Pressure, inches $H_2O$ | None | 11.5 | 11.5 | 11.0 |
| Maximum Rate, lbs/hr/inch | 6.8 | 9.2 | 10.9 | 9.9 |
| Frost Line height, inches | 30 | 39 | 45 | 35 |
| Limiting Instability for Increased Rate | Slump | Spiral Whip | | Slump |

Example 22 is included for comparison purposes only since only a single cooling ring is provided. In addition, Examples 23–25 are not intended to illustrate the high film production rates obtainable with the present invention but rather, to only show the effects of large air volume from the primary cooling ring on the stability of the film bubble. The data show that when the air volume from the primary cooling ring exceeds a moderate value (either from high supply pressure or high lip gap), bubble instability develops either in the form of "slumping" (i.e., alternating waists and bulges in film bubble) or violent spiral whipping (i.e., spiral twisting of the film bubble).

It is apparent to those skilled in the art that various other changes and modifications may be made in the present invention without departing from the spirit and scope thereof. It is the intention not to be limited by the foregoing description, but rather only by the scope of the claims appended hereto.

What is claimed is:

1. A process for cooling a molten tube of a low strain hardening polymer, while maintaining the stability of said molten tube, which comprises contacting the outside periphery of said molten tube with at least two annular streams of cooling fluid from at least two annular cooling rings disposed around said molten tube and through which said tube advances, wherein substantially all of the cooling fluid flows parallel to and in the same direction as said tube and exits the system through a common plane formed by the last cooling ring through which said tube advances.

2. A process according to claim 1, wherein the extensional viscosity index of said polymer is no greater than about 4.5, said index comprising the ratio of the extensional viscosity of said polymer at a total Hencky strain of 2 to its extensional viscosity at a total Hencky strain of 0.2, both calculated at a strain rate of 1 second$^{-1}$.

3. A process according to claim 1, wherein said polymer is a low pressure polymerized-low density copolymer of ethylene and at least one $C_3$ to a $C_8$ alpha-olefin hydrocarbon.

4. A process according to claim 3, wherein said polymer is a copolymer of at least 90 mole percent ethylene and less than 10 mole percent of said $C_3$ to $C_8$ alpha-olefin hydrocarbon.

5. A process according to claim 1, wherein said advancing molten tube is a film bubble formed by tubular blown extrusion and is cooled by two annular streams of cooling fluid from upper and lower annular cooling rings, and said upper cooling ring is downstream of said lower cooling ring.

6. A process according to claim 5, wherein the amount and velocity of cooling fluid from said lower cooling ring is sufficient to cool said film bubble by about 75° to about 100° F.

7. A process according to claim 5, wherein said upper cooling ring is disposed downstream of said lower cooling ring by a distance of from about 4 to 15 inches.

8. A process according to claim 7, wherein the space between said upper and lower cooling rings is sealed to prevent said cooling fluid from exiting the system from said space.

9. A process according to claim 5, wherein said lower cooling ring comprises a dual lip air ring.

10. A process according to claim 9, where said air ring is recessed into the face of said die.

11. A process according to claim 9, wherein said air ring is disposed around said molten film bubble at a distance above the face of said die to define a space through which a portion of said cooling fluid is vented from the system.

12. A process according to claim 10, wherein said air ring is disposed around said molten film bubble at a distance above the face of said die recess to define a space through which a portion of said cooling fluid is vented from the system.

13. A process according to claim 5, wherein said upper cooling ring comprises a single orifice air ring.

14. A process according to claim 13, wherein the upper lip height of said upper air ring is no more than about 4 inches.

15. A process according to claim 1, wherein the lip of said die gap is greater than 50 mils.

16. A process according to claim 3, wherein said polymer contains up to 10 weight percent, based on the total polymer weight, of a high pressure-low density polyethylene.

17. Apparatus for producing a film tube from a low strain hardening polymer comprising:
  means including a die for extruding a molten tube of said polymer; and
  means for cooling said molten polymer tube whereby a frost line is formed while maintaining the stability of said molten polymer tube, including at least 2 annular cooling rings disposed around said molten polymer tube upstream of said frost line, each of said cooling rings being provided with means for forcing an annular stream of cooling fluid into contact with the outside periphery of said molten polymer tube, said cooling means further including means for venting said cooling fluid from said apparatus whereby substantially all of said cooling fluid flows parallel to and in the same direction as said tube and exits said apparatus through a common plane formed by the last cooling ring through which said polymer tube advances.

18. An apparatus according to claim 17, wherein said cooling rings include upper and lower cooling rings, said lower cooling ring is disposed adjacent the face of said die and said upper cooling ring is downstream of said lower cooling ring.

19. An apparatus according to claim 18, wherein said lower cooling ring comprises a dual lip air ring.

20. An apparatus according to claim 19, wherein said air ring is recessed into the face of said die.

21. An apparatus according to claim 19, wherein said air ring is disposed around said molten polymer tube at a distance above the face of said die to define a space through which a portion of said cooling fluid is vented from the system.

22. An apparatus according to claim 20, wherein said air ring is disposed around said molten polymer tube at a distance above the face of said die recess to define a space through which a portion of said cooling fluid is vented from the system.

23. An apparatus according to claim 18, wherein said upper cooling ring comprises a single orifice air ring.

24. An apparatus according to claim 23, wherein the height of the upper lip of said orifice air ring is no more than 4 inches.

25. An apparatus according to claim 17, wherein the lip gap of said die is greater than 50 mils.

26. An apparatus according to claim 18, wherein said upper cooling ring is disposed downstream of said lower cooling ring by a distance of from about 4 to 15 inches.

27. An apparatus according to claim 26, wherein the space between said upper and lower cooling rings is sealed to prevent said cooling fluid from exiting the system from said space.

* * * * *